(12) United States Patent
Hand (10) Patent No.: US 8,386,283 B2
(45) Date of Patent: Feb. 26, 2013

(54) INTEGRATION OF REAL-TIME FIELD DATA IN CHEMICAL DELIVERY VEHICLE OPERATIONS

(75) Inventor: Lynn Hand, Chandler, AZ (US)

(73) Assignee: Trimble Navigation Limited, Sunnyvale, CA (US)

( * ) Notice: Subject to any disclaimer, the term of this patent is extended or adjusted under 35 U.S.C. 154(b) by 293 days.

(21) Appl. No.: 12/727,105

(22) Filed: Mar. 18, 2010

(65) Prior Publication Data

US 2011/0231217 A1 Sep. 22, 2011

(51) Int. Cl.
*G06Q 40/00* (2012.01)
(52) U.S. Cl. ........................... 705/7.11; 705/7.42
(58) Field of Classification Search .......... 705/7, 7.11, 705/7.42
See application file for complete search history.

(56) References Cited

U.S. PATENT DOCUMENTS

| | | | | |
|---|---|---|---|---|
| 5,154,314 A | * | 10/1992 | Van Wormer | 222/1 |
| 5,272,638 A | * | 12/1993 | Martin et al. | 455/456.5 |
| 5,758,313 A | * | 5/1998 | Shah et al. | 455/456.2 |
| 5,826,749 A | * | 10/1998 | Howland et al. | 222/1 |
| 7,945,498 B2 | * | 5/2011 | Giesler et al. | 705/35 |
| 2004/0220844 A1 | * | 11/2004 | Sanville et al. | 705/8 |
| 2005/0171896 A1 | * | 8/2005 | Seretti et al. | 705/37 |
| 2006/0282274 A1 | * | 12/2006 | Bennett | 705/1 |
| 2009/0216594 A1 | * | 8/2009 | Verhey et al. | 705/8 |

* cited by examiner

*Primary Examiner* — Thomas Dixon
*Assistant Examiner* — Benjamin S Fields (57) ABSTRACT

A method and system for integration of real-time field data in chemical delivery vehicle operations is disclosed. Initially, information for a plurality of regions designated for chemical delivery is received at a command center, each of the plurality of regions having a defined boundary. Real-time and forecast environmental conditions are utilized in conjunction with prior and real-time field data to rank each of the plurality of regions. One or more chemical delivery vehicles are automatically selected and dispatched to one or more of the plurality of regions. When the one or more chemical delivery vehicles are within the defined boundary of one of the plurality of regions for chemical delivery, region specific chemical delivery procedures incorporating real-time environmental conditions are automatically calculated and initiated.

21 Claims, 6 Drawing Sheets

INTEGRATION OF REAL-TIME FIELD DATA IN CHEMICAL DELIVERY VEHICLE OPERATIONS

FIELD

The invention relates to integration of real-time field data in chemical delivery vehicle operations.

BACKGROUND

Geographic information systems (GIS) technology is increasingly used to provide geo-spatial data to a wide variety of business, government, and academic applications. GIS is often described as a collection of computer hardware, software, geographic data, and personnel which combine to record, store, process, interpret, and distribute geographically referenced data. GIS permit users to selectively interpret geo-spatial data in order to identify relationships, patterns, or trends that may not be readily discerned using traditional charts, graphs, or spreadsheets.

However, there are several factors which limit the use of GIS. One factor is the cost of deploying data collectors for GIS systems. Dedicated GIS data collectors are often large (e.g., up to 4-5 pounds) and expensive ($1500-$5000) per unit. Adding to the expense per-unit is the need for a console to which the recorded GIS data is downloaded. Many organizations use a dedicated personal computer (PC) for each deployed GIS data collector. The PC is needed in order to upload data dictionaries onto the GIS data collector which describe what data will be recorded that day and to download their recorded data at the end of the day. Additionally, at the end of the day, bottlenecks in downloading the collected data may occur if all of the users are at the office at the same time.

SUMMARY OF THE INVENTION

Embodiments provided herein recite methods and systems for integration of real-time field data in chemical delivery vehicle operations. Initially, information for a plurality of regions designated for chemical delivery is received at a command center, each of the plurality of regions having a defined boundary. Real-time and forecast environmental conditions are utilized in conjunction with prior and real-time field data to rank each of the plurality of regions. One or more chemical delivery vehicles are automatically selected and dispatched to one or more of the plurality of regions. When the one or more chemical delivery vehicles are within the defined boundary of one of the plurality of regions for chemical delivery, region specific chemical delivery procedures incorporating real-time environmental conditions are automatically calculated and initiated.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF EMBODIMENTS

Embodiments disclosed herein provides near real-time tracking of vehicles directly in GIS. By utilizing one or more of the embodiments provided herein, the many benefits of real-time vehicle location knowledge are gained. These benefits include a reduction in the number of unauthorized stops or unauthorized vehicle utilizations. Moreover, real-time dispatch intervention can be invaluable in correcting errors such as off-course mistakes, unauthorized idling, or off-site spraying at nearly the time that the mistake begins to occur, thereby significantly mitigating the opportunities for the error to continue unrecognized.

In addition to the previously stated vehicle location benefits, architecture for further functionality can also be built upon the foundation of real-time vehicle location knowledge. For example, when a vehicle is within the spray zone "on job" notations, alerts and even remote activation of the delivery system can be utilized to ensure the chemicals are being delivered. Further, the speed of the vehicle can be recorded into the database along with the environmental information to ensure proper delivery and dispersal characteristics are maintained. Moreover, if the chemicals stop being delivered "on job" a not spraying notification can be generated, the delivery mechanism can be remotely re-activated and the location of the unauthorized non-delivery can be clearly defined.

Similarly, when the vehicle leaves the spray zone, "off job" notations, alerts and even remote deactivation of the delivery system can be utilized to ensure the chemicals are not being delivered. Moreover, if the chemicals begin to be delivered "off job" an unauthorized spray notification can be generated, the delivery mechanism can be remotely deactivated and the location of the unauthorized delivery is clearly defined.

Figure 1:
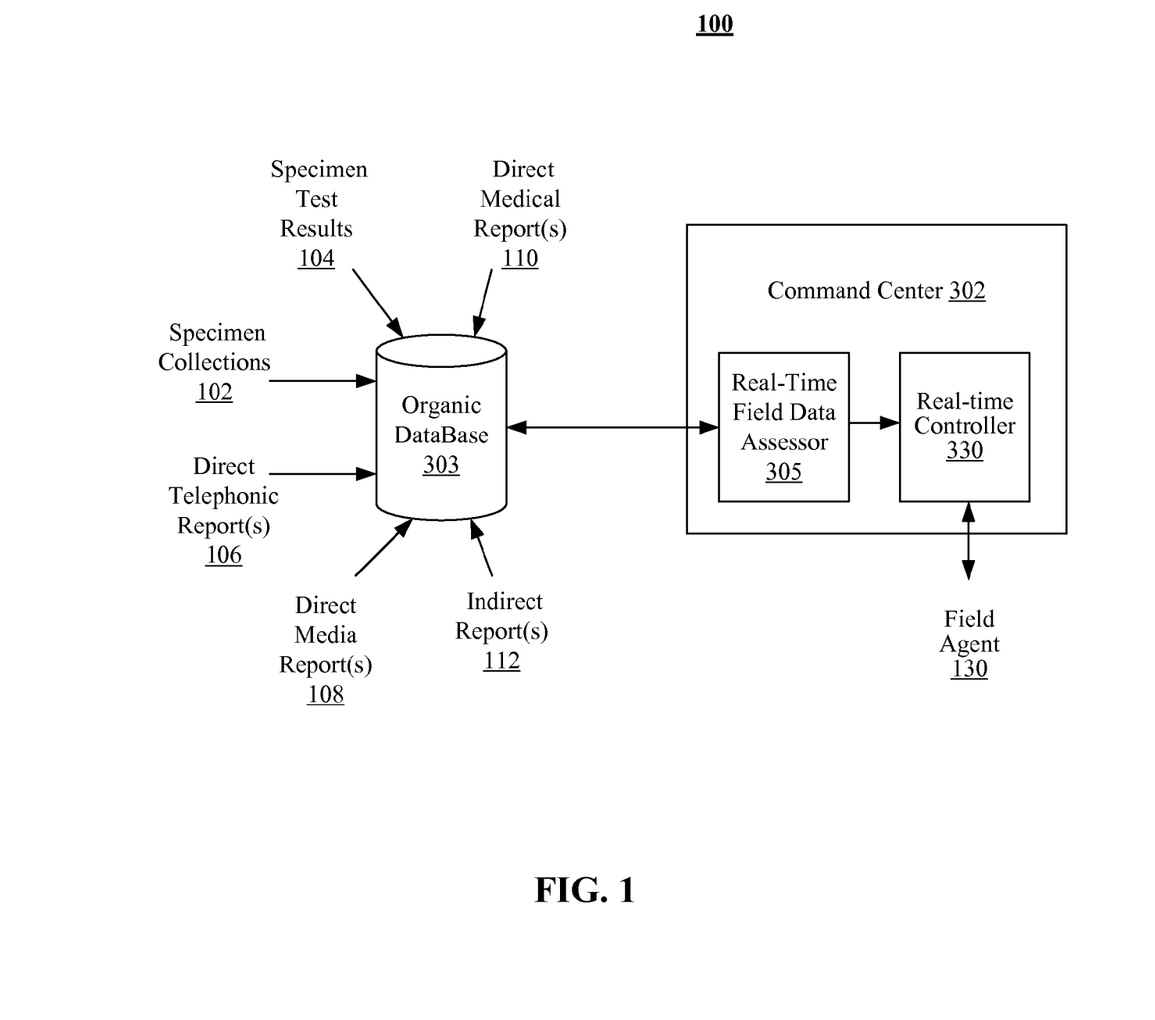
FIG. 1 is a block diagram of a real-time organic data collection system with a real-time field agent controller in accordance with an example of the present technology.

With reference now to FIG. 1, a block diagram of a real-time organic data collection system 100 with a real-time field agent 130 controller is illustrated in accordance with an example of the present technology. In one example, real-time organic data collection system 100 includes an organic database 303, a command center 302 that includes a real-time field data assessor 305 and real-time controller 330, and a field agent 130.

For purposes of clarity in the following discussion, organic database 303 is populated and updated with information that pertains to organic matter. In other words, in the present example the information stored at organic database 303 includes information related to living, or previously living, matter. However, in another example, any type of information may be stored on organic database 303. Moreover, in yet another embodiment, any or all of the information presently described as being stored on organic database 303 may be stored in a non-specific database and real-time field data assessor 305 may access the non-specific database to obtain any desired information.

For example, in one embodiment, organic database 303 may be a centralized geographic information system (GIS) database which stores information on all insect control organizations globally. For example, organic database 303 may maintain and update polygon outlines of the geo-locations for which each organization is responsible. Organic database 303 may also maintain data on the types of insects for which each organization is responsible as well as contact information and rules for forwarding incoming data. One rule may include insect control organizations either belong to, or paying a fee for, the service of receiving incoming messages. In so doing, the GIS organic database 303 may allow for a large-scale, near-real time collection and sharing of insect problem information across geo-political boundaries.

In one embodiment, organic database 303 includes data such as, but not limited to, specimen collections 102, specimen test results 104, direct telephone report(s) 106, direct media report(s) 108, direct medical report(s) 110 and indirect report(s) 112. In the following discussion, the data in organic database 303 includes prior collected data as well as real-time data.

Specimen collections 102 may include trapping, water testing and larvaciding, dead animal pickup—such as dead bird collection and the like. Specimen test results 104 refers to laboratory or other examination results that are performed on specimens such as from specimen collections 102. As stated herein, organic database 303 is capable of being updated in approximately real-time. Therefore, almost all lag time is removed between the times that the specimen test results 104 are obtained and when they are entered into organic database 303.

Direct telephonic report(s) 106 and direct media report(s) 108 describe the ability for anyone, including government workers or the general population to send a report to organic database 303. In general, direct media report(s) 108 refers to pictures, text messages, emails or any other type of message that is reported to organic database 303. In one example, direct telephonic report(s) 106 and direct media report(s) 108 may also include location information. In addition, direct medical report(s) 110 may be provided to organic database 303 from medical facilities such as clinics, hospitals, emergency rooms, fire departments, police departments and the like.

In the present discussion, the direct terminology refers to a person or agency purposefully providing the telephonic or media reports directly to controlling agency. In contrast, indirect report(s) 112 refers to information collected via methods such as social-media data mining and the like. For example, one embodiment may monitor news reports or other audio or video media for the mention of key words. For example, media may be monitored for stories about dangerous wildlife such as sick and potentially rapid skunks and raccoons, reports of alligators in residential water bodies, discussions about a location where a large number of dead birds had been found.

In another embodiment, indirect report(s) 112 may utilize photo-recognition technology, text recognition, and the like to monitor Internet traffic. For example, a social website posting of a photo or message reporting and geo-locating the sighting of a dead bird, a photo or message reporting geo-locating an insect infestation on land, in water, or the like. Upon recognition of such an event, indirect report(s) 112 would enter the information into organic database 303. The information would then be assessed by real-time field data assessor 305 to determine if a response was needed.

Indirect report(s) 112 may scan and collect data from social networking internet sites suggesting insect problems or insect borne diseases that might need to be addressed. For example, a blog posting that states, "We went camping with the cub scouts two-weeks ago at Lake Pleasant and got eaten alive by mosquitoes." Indirect report(s) 112 would capture the "Mosquitoes" information along with the geo-location "Lake Pleasant", as well as any user location or contact information that may be present, including for example the web address for the blog.

In one embodiment, once indirect report(s) 112 had found the "Lake Pleasant" information, indirect report(s) 112 may retrieve additional key words to search for other postings that refer to the "Lake Pleasant" area or review the user's earlier posts. For example, when expanding the search to the Lake Pleasant area, indirect report(s) 112 finds an additional posting, "We got the blood-tests back today and Roger has West Nile Virus." Again, indirect report(s) 112 would capture and report at least "West Nile Virus" and the geo-location of the infected party to the organic database 303. In one embodiment, the next time real-time field data assessor 305 accessed organic database 303 and found the two related postings, real-time field data accessor 305 would pass the information to real-time controller 330 which would then provide a tasking to a field agent 130, a Lake Pleasant area Police Officer, Hazmat official or the like, for further investigation and response. In one embodiment, member organizations may select to opt-in or opt-out of receiving or monitoring any social media data.

In operation, real-time field data assessor 305 periodically accesses and reviews the information in organic database 303 with the purpose of early identification of any potential problem or anomalies. For example, real-time field data assessor 305 may perform a statistical analysis to determine if social postings in a certain location are above average, e.g., statistically significant to indicate a problem brewing, and determine what the critical levels of postings for a given area should be. In one example, the critical levels may be based on past data collections. When a threshold is met, real-time field data assessor 305 will forward the data to real-time controller 330 to implement the proper response. For example, real-time controller 330 may inform the appropriate controlling agency, assign a task to a field agent 130, or the like.

For example, suppose a larger than normal number of dead birds had been recently reported at a certain location. Real-time field data assessor 305 will recognize the anomalous activity and pass the dead bird report activity along with any location information and/or contact information to real-time controller 330. Real-time controller 330 will generate a tasking for a field agent 130. In general, the tasking will include having the field agent 130 perform specimen collections 102 of the dead birds and deliver the specimens to a designated lab for analysis.

In one embodiment, real-time controller 330 will also generate a priority for the tasking. For example, real-time controller 330 will know the new tasking location along with the present locations, routes and schedules of each field agent 130. As such, when generating a tasking and priority based on the latest information, real-time controller 330 may review the locations of a number of field agents 130 already deployed in the field and send an updated route to the field agent 130 closest to the new location. For example, if a field agent 130 will be passing close to the new location when returning, real-time controller 330 will addend the location to the field agent's returning route. In another example, if the real-time updated information results in a new location having a higher priority status, real-time controller 330 may re-task a field agent 130 from a now lower priority location to the now higher priority location. Moreover, if real-time controller 330 generates the specimen collections tasking as an extremely high priority, a number of field agents 130 may be re-tasked to the new location for collection and further investigation.

Figure 2:
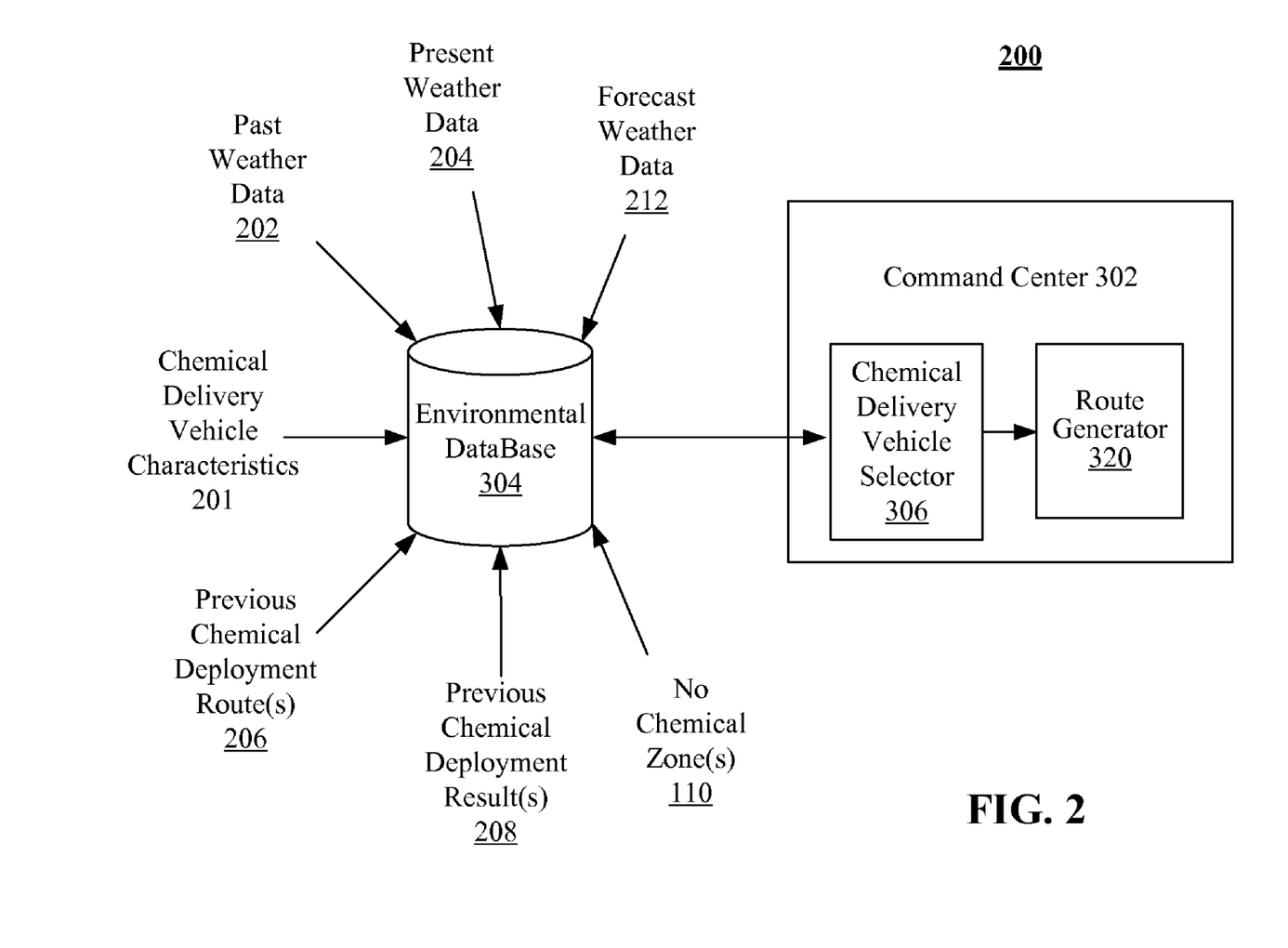
FIG. 2 is a block diagram of a real-time environmental data collection system with a chemical delivery vehicle selector and a route generator in accordance with an example of the present technology.

With reference now to FIG. 2, a block diagram of a real-time environmental data collection system 200 with a chemical delivery vehicle selector 306 and a route generator 320 is illustrated in accordance with an example of the present technology. In one example, real-time environmental data collection system 200 includes an environmental database 304 and a command center 302 that includes a chemical delivery vehicle selector 306 and a route generator 320.

For purposes of clarity in the following discussion, environmental database 304 is similar in form and function with organic database 303. However, instead of being populated and updated with information that pertains to organic matter, environmental database 304 is populated with environmental information such as past weather data 202, present weather data 204, forecast weather data 212, chemical delivery vehicle characteristics 201, previous chemical deployment route(s) 206, previous chemical deployment result(s) 208 and no chemical zone(s) 110. However, in another example, any type of information may be stored on environmental database 304. Moreover, in yet another embodiment, any or all of the information presently described as being stored on environmental database 304 may be stored on organic database 303 or in a non-specific database. In other words, in one embodiment, environmental database 304 is a geographic information system (GIS) database similar to previously described organic database 303. In another embodiment, environmental database 304 and organic database 303 may be part of the same database or spread across a plurality of communicatively coupled databases.

In one embodiment, chemical delivery vehicle characteristics 201 include vehicle specifications such as real time speed and direction of travel. Additionally, chemical delivery vehicle characteristics 201 also includes chemical delivery specifications such as sprayer, fogger, delivery range, maximum area coverage per chemical and per amount of chemical, plume analysis and other metrics.

Past weather data 202 refers to weather that has already occurred while present weather data 204 refers to real-time weather conditions. Forecast weather data 212 refers to the future weather assumptions. In general, the weather information may include rain, wind, sunshine, temperature, fog, dew point, humidity, sunrise, sunset, cloudiness, and the like.

Chemical delivery vehicle selector 306 accesses environmental database 304 and utilize the information therein to select the appropriate chemical delivery vehicle for a specified region. For example, chemical delivery vehicle selector 306 and/or route generator 320 can utilize chemical delivery vehicle characteristics 201 in conjunction with the forecast weather data 212 to generate a virtual mock-up display of a chemical's plume of coverage from each sprayer/fogger vehicle and or aircraft. In so doing, any gaps and/or overlaps in a planned route's chemical coverage can be visually displayed. Chemical delivery vehicle selector 306 and/or route generator 320 can also access previous chemical deployment route(s) 206 in conjunction with previous chemical deployment result(s) 208 to aid in plume analysis, as well as providing a visual display showing where gaps and/or overlaps may have occurred in the past.

In one embodiment, the virtual mock-up plume analysis information can also be used by chemical delivery vehicle selector 306 and or route generator 320 to create compliance reports for use of chemicals.

In one embodiment, once the chemical delivery vehicle(s) have been selected by chemical delivery vehicle selector 306, route generator 320 will commence automatic route creation and optimization. In another embodiment, route generator 320 and chemical delivery vehicle selector 306 both work to create and optimize the route. In other words, if a number of different chemical delivery vehicles are available, an optimized route might require a single type of vehicle or a plurality of different chemical delivery vehicle types. For example, chemical delivery vehicle selector 306 and route generator 320 may utilize a truck for a first region or portion of a region with good road access and then select an aircraft or boat to deliver the chemicals in a second region or portion of a region. For example, a portion may have limited or no road access, be in the edges of a lake or river that would be easier reached by water or aircraft, etc.

Although the discussion has clearly illustrated that numerous variables and considerations exist in the route planning and vehicle selecting processes, for purposes of clarity the following example is based on route generator 320 planning a route to deliver chemicals to a region utilizing one or more ground based chemical delivery vehicles.

In the example, route generator 320 analyzes streets within a pre-defined spray/fog zone and automatically calculates and creates an optimized Fog Route for each chemical delivery vehicle. In one embodiment, route generator 320 utilizes vehicle specifications, plume specifications, real-time and forecasted weather conditions, no chemical zones 110, and temporal data to account for plume coverage during the creation of fog routes and attempts to avoid both duplication of coverage and gaps in coverage. In general, temporal data refers to data such as "Do not spray/fog on Friday nights, between 7 pm and 10 pm, March through June" (e.g., High School Football game) or "spray/fog only March through April and September through October" (e.g., areas of seasonal infestation), and the like.

With reference now to FIG. 3, a block diagram of a complete command center system 300 is illustrated in accordance with an example of the present technology. A number of components of system 300 have been previously discussed and are not repeated herein for purposes of clarity.

In one embodiment, system 300 includes a plurality of regions 301. The term region is utilized herein to describe an area within specific boundaries. One method for delineating each region is with the utilization of a geofence. In general, a geofence is a border or "fence" that is drawn on an electronic map presented on a graphical user interface (GUI). A geofence can be drawn around a certain route or an entire area. In one embodiment, the geofence information is stored in a CrossCheck device. Once it has been drawn on an electronic map, the geofence can be displayed on any number of devices such as, but not limited to, the control center GUI and a portable GNSS device carried or mounted in the chemical delivery vehicle. In addition, the chemical delivery vehicle is tagged so that it shows up on the electronic map at its precise location at all times.

By adjusting the size of the geofence with respect to the actual region, and providing a specific asset travel distance past the geofence at which the alert is sent, the geofence becomes a firm boundary for each of the pluralities of regions. In other words, once the tagged chemical delivery vehicle enters the geofence region, travel outside of the geofence region will trigger an alert. In one embodiment, the chemical delivery system can be remotely controlled so that it can be turned on by someone at the control GUI when the asset enters the geofence area and can be turned off if any excursions outside of the geofence occur.

In another embodiment, the chemical delivery system may be automatically controlled by real-time controller 330 such that when the chemical delivery vehicle enters the geofence the real-time controller 330 can automatically activate the delivery system and when the chemical delivery vehicle exits the geofence the real-time controller 330 can automatically deactivate the delivery system. In another embodiment, the vehicle occupant may activate and deactivate the delivery system while the real-time controller 330 or supervisor monitoring the control GUI can override the activation and deactivation commands of the vehicle occupant if necessary.

Figure 3:
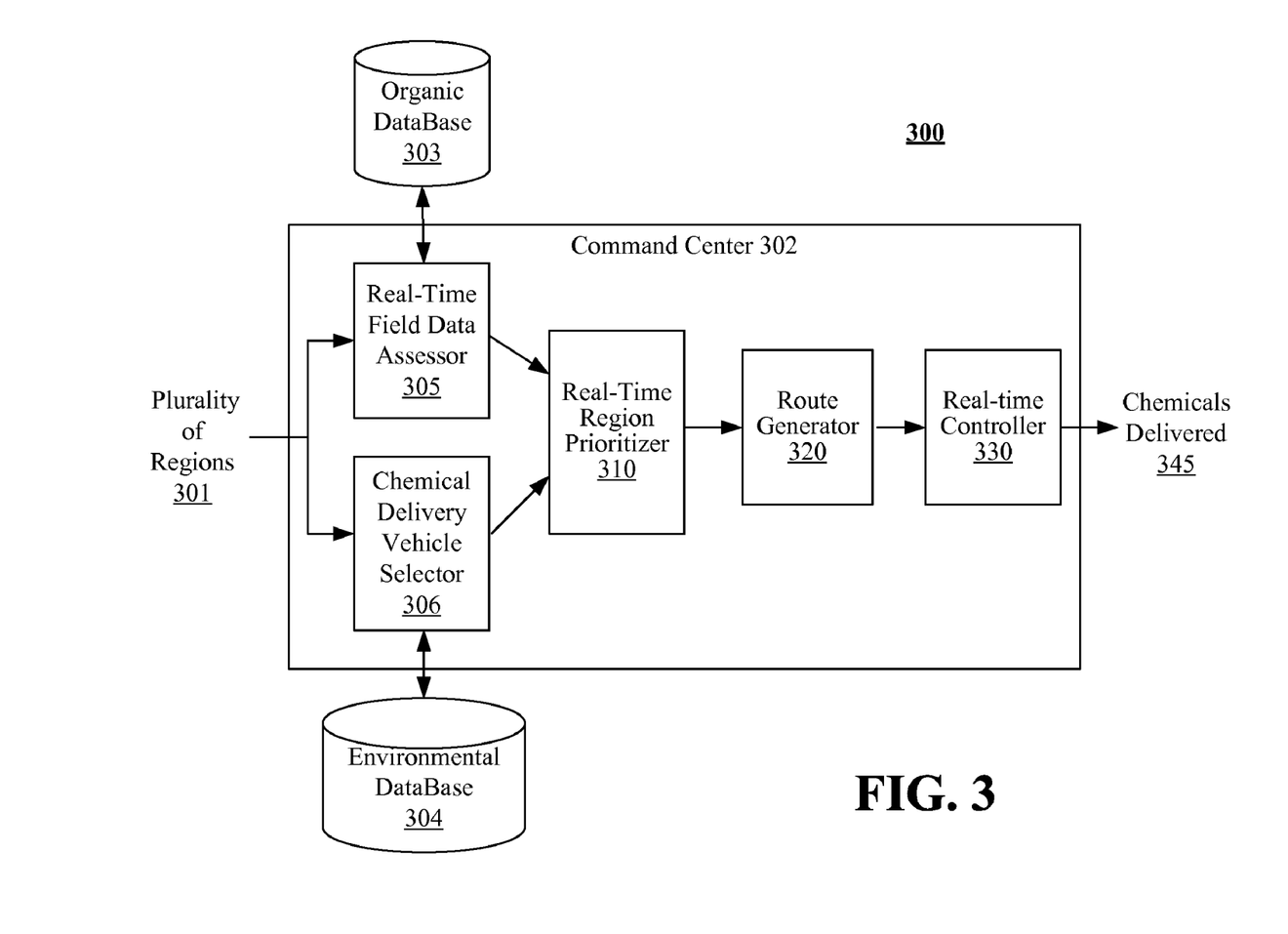
FIG. 3 is a block diagram of a command center system in accordance with an example of the present technology.

Although FIG. 3 illustrates both an organic database 303 and an environmental database 304. As previously stated herein, the illustration of two databases is provided for purposes of clarity. The technology is well suited to using only a single database or any number of databases. Further, the organization of the databases herein is representative of one example, provided for clarity. The actual organization of the database(s) may be context dependent, based on storage capacity and growth requirements, user preference, or the like.

Command center 302 includes real-time field data assessor 305 and chemical delivery vehicle selector 306. Different than discussed in FIGS. 1 and 2, a plurality of regions 301 are provided to command center 302 and the information from both real-time field data assessor 305 and chemical delivery vehicle selector 306 is provided to real-time region prioritizer 310. In general, real-time region prioritizer 310 is utilized to prioritize the order in which the chemicals are delivered to the plurality of regions. For example, input from chemical delivery vehicle selector 306 may provide information to real-time region prioritizer 310 such as there are more delivery regions 301 than chemical delivery vehicles. In another example, input from chemical delivery vehicle selector 306 may provide information such as all of the area of plurality of regions 301 can be covered in a single out and back trip, that a plurality of out and back trips per vehicle will be required, or that some vehicles have different ranges, load capacities, delivery area requirements, etc.

Similarly, input from real-time field data assessor 305 may provide region specific priority information to real-time region prioritizer 310. For example, one of the plurality of regions 301 may be a must deliver region while another region may be a by the end of week deliver, or that the weather is presently outside of the allowable delivery envelope, e.g., high wind, rain, etc.

Furthermore, even after real-time region prioritizer 310 has finished prioritizing the regions, new approximately real-time information may be received that would cause real-time region prioritizer 310 to modify the prioritizing solution. For example, significant present weather data 204 or forecast weather data 212 changes may be received from chemical delivery vehicle selector 306. In another example, specimen test results 104 received by real-time field data assessor 305 may change a region's priority or introduce a new higher priority region to the original plurality of regions 301. Thus, throughout the deployment of the chemical delivery, real-time data continues to be reviewed, evaluated and assessed to ensure that the highest priority region is receiving the proper attention. Additionally, the real-time updates ensure little to no time or expenses are wasted on lower priority regions or unserviceable regions, such as a region outside of its weather condition limitations or a region having a last minute sporting event.

Command center 302 also includes route generator 320 as described herein. However, in operation, route generator 320 is also real-time adjustable. For example, route generator 320 may have to perform dynamic, near real-time changing of the delivery routes based on real-time weather conditions (e.g., wind direction and speed) as this affects plume coverage.

In addition, route generator 320 may have to perform a dynamic, near real-time changing of spray routes based on changes in the main GIS database. (e.g., the addition of new no-spray zones). In one embodiment, if a new no-spray zone is added while the chemical delivery vehicles are on the way to deliver or delivering, route generator 320 provides the new route information to real-time controller 330 which automatically routes the chemical delivery vehicle around and away from the no-spray zones using known fogger plume coverage settings and the approximately real-time vehicle location information.

In one embodiment, real-time controller 330 monitors each chemical delivery vehicle location in approximately real-time. Real-time controller 330 may also provide a visual representation of the real-time chemical delivery vehicle location to a graphic user interface (GUI) for a dispatch operator, or the like. Information monitored by real-time controller 330 can include correct chemical validation, vehicle speed, deviations in route, fuel consumption, mileage information, idle time reports, safe driver score cards, mobile worker optimization score cards, driver time sheets, off-hour and/or unauthorized usage, stop reports, speeding alerts, delivery on/off events, and the like.

In addition, real-time controller 330 may provide a visual representation of the real-time chemical delivery including a spray zone plume analysis based on sprayer settings and weather conditions. Real-time controller 330 may also provide any and all other monitored information about each chemical delivery vehicle on a GUI having an overlay of a map of the region for real-time human monitoring, such as by a supervisor, dispatcher, watchdog group, enforcement agency or the like. In one embodiment, the information displayed on the GUI may be preference based and dynamically adjustable. For example, an enforcement agency may want to see an uncluttered screen showing only delivery information. In contrast, a supervisor may want to see speeding information, deviation in route, fuel consumption, and other managerial type data.

In one example, real-time controller 330 may automatically provide adjustment to the pre-defined automated routes to allow for fine-tuning or special exceptions. In another embodiment, the supervisor, dispatcher or the like may utilize the GUI representation provided by real-time controller 330 to provide adjustment to the pre-defined automated routes.

In another example, real-time controller 330 may cause a visual signal and/or audio alert to occur at the vehicle and/or to the supervisor or dispatcher in near real-time if the chemical delivery vehicle strays from the predefined routes. Similarly, a user utilizing the GUI representation provided by real-time controller 330 may cause a visual signal and/or audio alert to occur at the vehicle in near real-time if the vehicle strays from the predefined routes.

In addition, real-time controller 330 is capable of remotely controlling the delivery of the chemicals and/or the vehicle. For example, if the chemical delivery vehicle is within the prescribed delivery region, real-time controller 330 can remotely activate chemical delivery. Similarly, if the chemical delivery vehicle is delivering the chemical outside of the prescribed delivery region, real-time controller 330 can remotely deactivate chemical delivery. In another embodiment, real-time controller 330 may remotely shut down the chemical delivery vehicle if it is deemed unsafe. Similarly, the supervisor, dispatcher or the like may utilize the GUI representation provided by real-time controller 330 to remotely control the delivery of the chemicals and/or the vehicle. In so doing, the appropriate chemicals are delivered 345 properly and automatically according to a pre-defined automated methodology that is near real-time adjustable for near real-time changes including weather, breakouts, hot spots, no-spray zones, protestors, vehicle break-down, re-assignments, and the like.

Figure 4:
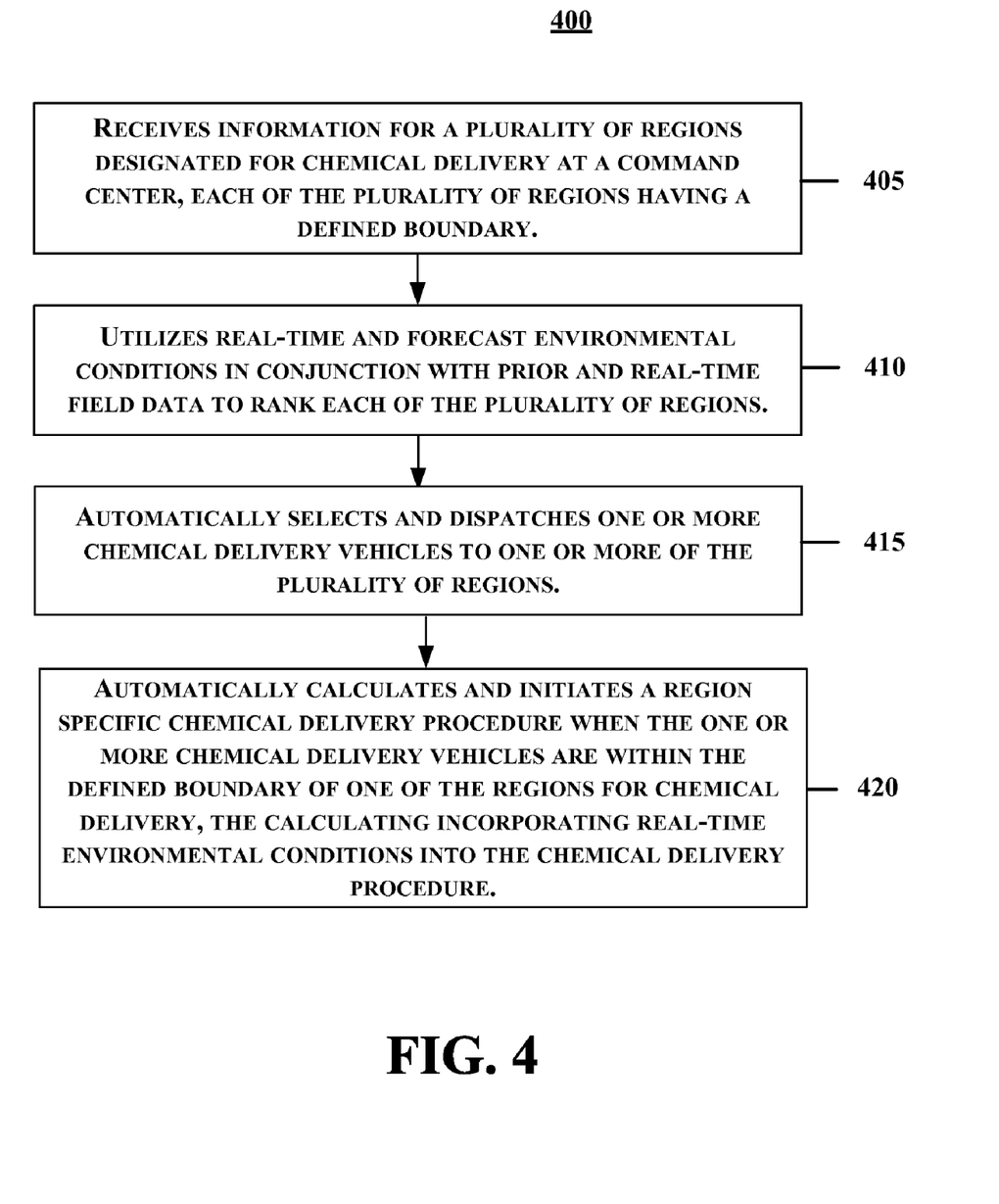
FIG. 4 is a flowchart of a method for integration of real-time field data in chemical delivery vehicle operations in accordance with an example of the present technology.

With reference now to flowchart 400 of FIG. 4 and to FIG. 3, an example of a method for providing automated command and control of chemical delivery is described. In the following example, certain aspects and details are utilized to provide a start to finish example of one embodiment for purposes of clarity.

At 405 of FIG. 4, one embodiment receives information for a plurality of regions 301 designated for chemical delivery at a command center 302, each of the plurality of regions 301 having a defined boundary. In one embodiment, the command center is similar to computing device 500 described in more detail below. Some actions described in the following example may be performed by a specific hardware component or collection of components. In another embodiment, certain processes are discussed that may be realized, in one embodiment, as a series of instructions that reside on a computer readable medium that may be executed by processor 502 of system 500. When executed, the instructions cause the computer system 500 to perform specific functions and exhibit specific behavior such as described herein.

In one example, the information received at the command center includes a defined boundary for each of said plurality of regions 301. As described herein, in one embodiment the boundary may be a virtual boundary such as a geofence or the like. The information received at command center 302 may also include a description of one or more chemicals to be delivered to each of the plurality of regions 301. Further, the information received at the command center may include a method for delivering the chemical within the defined boundary for each of the plurality of regions 301.

With reference now to 410 of FIG. 4, one embodiment utilizes real-time and forecast environmental conditions in conjunction with prior and real-time field data to rank each of the plurality of regions 301. For example, as described herein, the actual and the forecast weather conditions are utilized to automatically determine if one or more of the regions is within a pre-determined chemical delivery weather requirement envelope, for example within an assigned wind speed range, humidity range, temperature range, and the like. In one embodiment, field data refers to any prior and real-time region data consisting of information from field technicians, information provided by general public, image recognition, text recognition, news media monitoring, social-media data mining, and laboratory data.

With reference now to 415 of FIG. 4, one embodiment automatically selects and dispatches one or more chemical delivery vehicles to one or more of the plurality of regions. For example, the chemical delivery vehicles may be sprayers, foggers, and the like. In one embodiment, the one or more chemical delivery vehicles are ground vehicles. However, in another embodiment, the one or more chemical delivery vehicles may be airborne or waterborne. In a further embodiment, the delivery plan may include a combination of ground, airborne and/or waterborne chemical delivery vehicles.

A wireless network connection, wireless telephony connection, wireless radio connection, or the like is utilized to communicatively couple the command center 302 and the one or more chemical delivery vehicles. In other words, hardline connecting or removal of the GNSS device from the chemical delivery vehicle is not required.

In one embodiment, the command center utilizes the wireless connection with the one or more selected chemical delivery vehicles to confirm a chemical payload of the one or more selected chemical delivery vehicles. For example, some chemical delivery vehicles may be used to deliver weed killer to the side of the highway during one part of the day and then used to deliver mosquito control spray during another part of the day. In one embodiment, the command center 302 utilizes a PH and/or Spectrometry based chemical sensor integration to validate that the proper chemical is loaded into the delivery device before chemical delivery operations can begin. In another embodiment, the confirmation of the chemical payload is required before command center 302 will release the chemical delivery vehicle from the chemical loading yard.

In another embodiment, confirming the chemical payload also includes automatically authorizing one or more of the chemical delivery vehicles to obtain a load of the appropriate chemical or chemicals.

With reference still to 415 of FIG. 4, one embodiment automatically dispatches the one or more chemical delivery vehicles to one or more of the plurality of regions 301 for chemical delivery. In one embodiment, the wireless connection communicatively coupling the command center 302 and the one or more chemical delivery vehicles is utilized to automatically download the route information to a GNSS unit in the chemical delivery vehicle. Command center 302 also automatically sends a dispatch signal to the one or more chemical delivery vehicles authorizing them to depart for their assigned regions for chemical delivery. In one embodiment, the dispatch signal is provided after the GNSS unit in the chemical delivery vehicle has automatically confirmed receipt of the route information.

In one embodiment, the route and automatic dispatching information provides directions for traveling to one or more of the plurality of regions 301. The information includes in region route navigation information. In one embodiment, the information includes automatic chemical delivery system start and stop location specific commands.

With reference now to 420 of FIG. 4, one embodiment automatically calculates and initiates a region specific chemical delivery procedure when the one or more chemical delivery vehicles are within the defined boundary of one of the plurality of regions for chemical delivery. As described herein, the calculating incorporates real-time environmental conditions into the chemical delivery procedure. As described herein, in one embodiment, the defined boundary of the regions is a geofence. In one embodiment, the automatically calculating and initiating of the chemical delivery procedures includes utilizing the actual and forecast environmental conditions, the prior and real-time field data and chemical delivery vehicle characteristics to generate the region specific chemical delivery procedure.

Moreover, upon arrival, in one embodiment the real-time controller 330 will call for an update and re-assessing of the actual environmental conditions for each of the regions and the real-time field data for each of the plurality of regions. In one embodiment, real-time controller 330 will automatically call for a real-time review of the region route navigation information including automatic chemical delivery start and stop location commands for the one or more chemical delivery vehicles.

EXAMPLE GEOGRAPHIC INFORMATION SYSTEMS (GIS) TECHNOLOGY

One embodiment of the method and system for integrating the real-time field data collection, real-time command and control of chemical delivery from a vehicle and real-time analysis results from collected field data utilizes GIS. An example of GIS is provided herein for purposes of clarity and enablement. However, the present system and methods discussed herein are also well suited for data collection and collaboration systems and methods. The utilization of GIS is merely one of a plurality of possible geo-spatial data collection networks which would be suitable for utilization with one or more embodiments described herein.

A geographic information system (GIS) is a technological tool for comprehending geography and making intelligent decisions. GIS organizes geographic data so that a person reading a map can select data necessary for a specific project or task. A thematic map has a table of contents that allows the reader to add layers of information to a basemap of real-world locations. For example, a social analyst might use the basemap of Eugene, Oreg., and select datasets from the U.S. Census Bureau to add data layers to a map that shows residents' education levels, ages, and employment status. With an ability to combine a variety of datasets in an infinite number of ways, GIS is a useful tool for nearly every field of knowledge from archaeology to zoology.

A good GIS program is able to process geographic data from a variety of sources and integrate it into a map project. Many countries have an abundance of geographic data for analysis, and governments often make GIS datasets publicly available. Map file databases often come included with GIS packages; others can be obtained from both commercial vendors and government agencies. Some data is gathered in the field by global positioning units that attach a location coordinate (latitude and longitude) to a feature such as a pump station. GIS maps are interactive. On the computer screen, map users can scan a GIS map in any direction, zoom in or out, and change the nature of the information contained in the map. They can choose whether to see the roads, how many roads to see, and how roads should be depicted. Then they can select what other items they wish to view alongside these roads such as storm drains, gas lines, rare plants, or hospitals. Some GIS programs are designed to perform sophisticated calculations for tracking storms or predicting erosion patterns. GIS applications can be embedded into common activities such as verifying an address/or obtaining driving directions.

EXAMPLE COMPUTING SYSTEM

Figure 5:
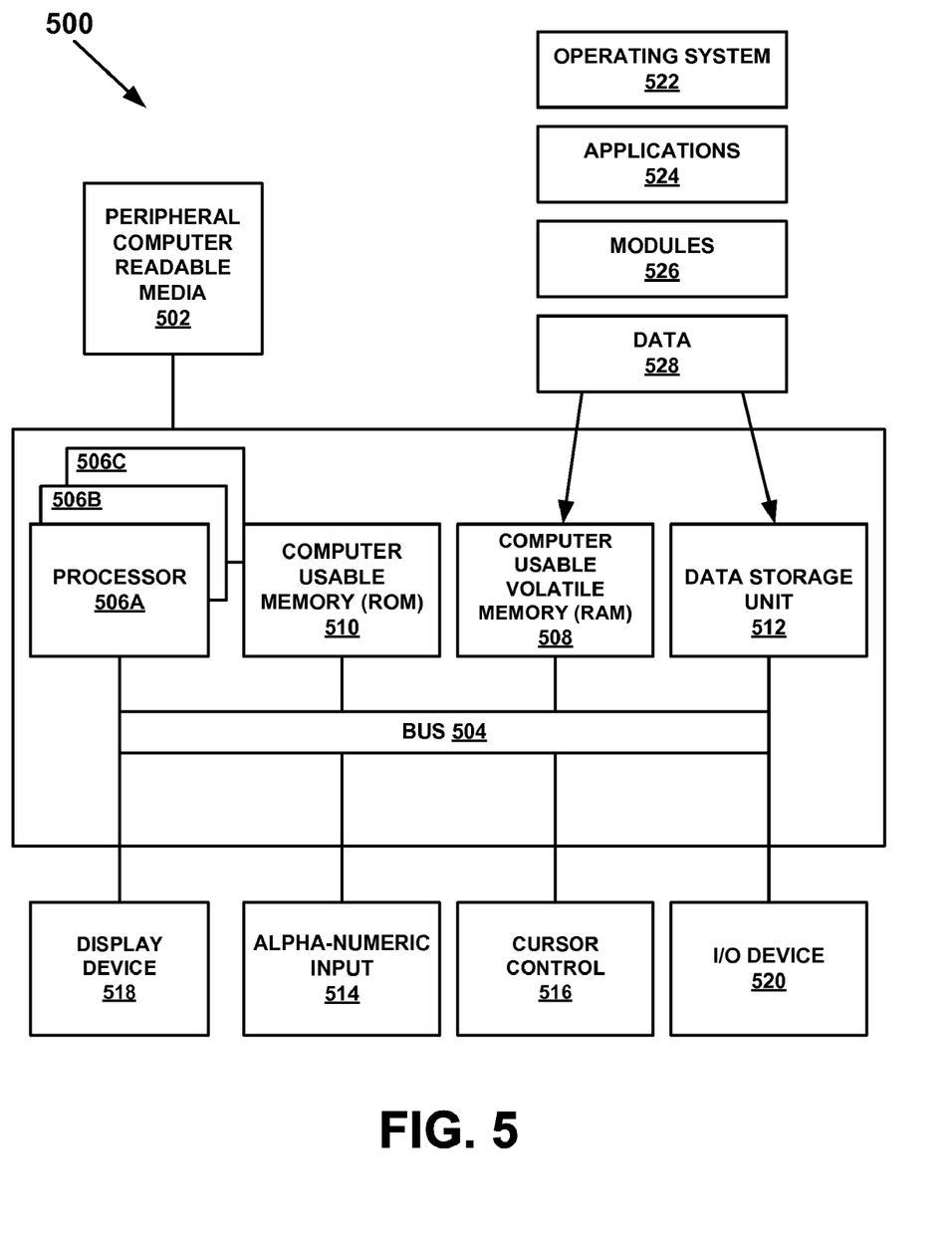
FIG. 5 is a block diagram of a computer system in accordance with one embodiment of the present technology.

With reference now to FIG. 5, portions of the technology may be composed of computer-readable and computer-executable instructions that reside, for example, on computer-usable media of a computer system. FIG. 5 illustrates an example of a computer system 500 that can be used in accordance with embodiments of the present technology. However, it is appreciated that systems and methods described herein can operate on or within a number of different computer systems including general purpose networked computer systems, embedded computer systems, routers, switches, server devices, client devices, various intermediate devices/nodes, standalone computer systems, and the like. For example, as shown in FIG. 5, computer system 500 is well adapted to having peripheral computer readable media 502 such as, for example, a floppy disk, a compact disc, flash drive, back-up drive, tape drive, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM) (e.g., static RAM, dynamic, RAM, etc.) coupled to bus 504 for storing information and instructions for processors 506A, 506B, and 506C. System 500 also includes computer usable non-volatile memory 510, e.g. read only memory (ROM) (e.g., read only memory, programmable ROM, flash memory, EPROM, EEPROM, etc.), coupled to bus 504 for storing static information and instructions for processors 506A, 506B, and 506C. Also present in system 500 is a data storage unit 512 (e.g., a magnetic or optical disk and disk drive, solid state drive (SSD), etc.) coupled to bus 504 for storing information and instructions.

System 500 also includes an alphanumeric input device 514 including alphanumeric and function keys coupled to bus 504 for communicating information and command selections to processor 506A or processors 506A, 506B, and 506C. System 500 also includes a cursor control device 516 coupled to bus 504 for communicating user input information and command selections to processor 506A or processors 506B, and 506C. System 500 of the present embodiment also includes a display device 518 coupled to bus 504 for displaying information. In another example, alphanumeric input device 514 and/or cursor control device 516 may be integrated with display device 518, such as for example, in the form of a capacitive screen or touch screen display device 518.

Referring still to FIG. 5, optional display device 518 of FIG. 5 may be a liquid crystal device, cathode ray tube, plasma display device or other display device suitable for creating graphic images and alphanumeric characters recognizable to a user. Cursor control device 516 allows the computer user to dynamically signal the movement of a visible symbol (cursor) on a display screen of display device 518. Many implementations of cursor control device 516 are known in the art including a trackball, mouse, touch pad, joystick, capacitive screen on display device 518, special keys on alpha-numeric input device 514 capable of signaling movement of a given direction or manner of displacement, and the like. Alternatively, it will be appreciated that a cursor can be directed and/or activated via input from alpha-numeric input device 514 using special keys and key sequence commands System 500 is also well suited to having a cursor directed by other means such as, for example, voice commands, touch recognition, visual recognition and the like. System 500 also includes an I/O device 520 for coupling system 500 with external entities. For example, in one embodiment, I/O device 520 enables wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512.

EXAMPLE GNSS RECEIVER

Figure 6:
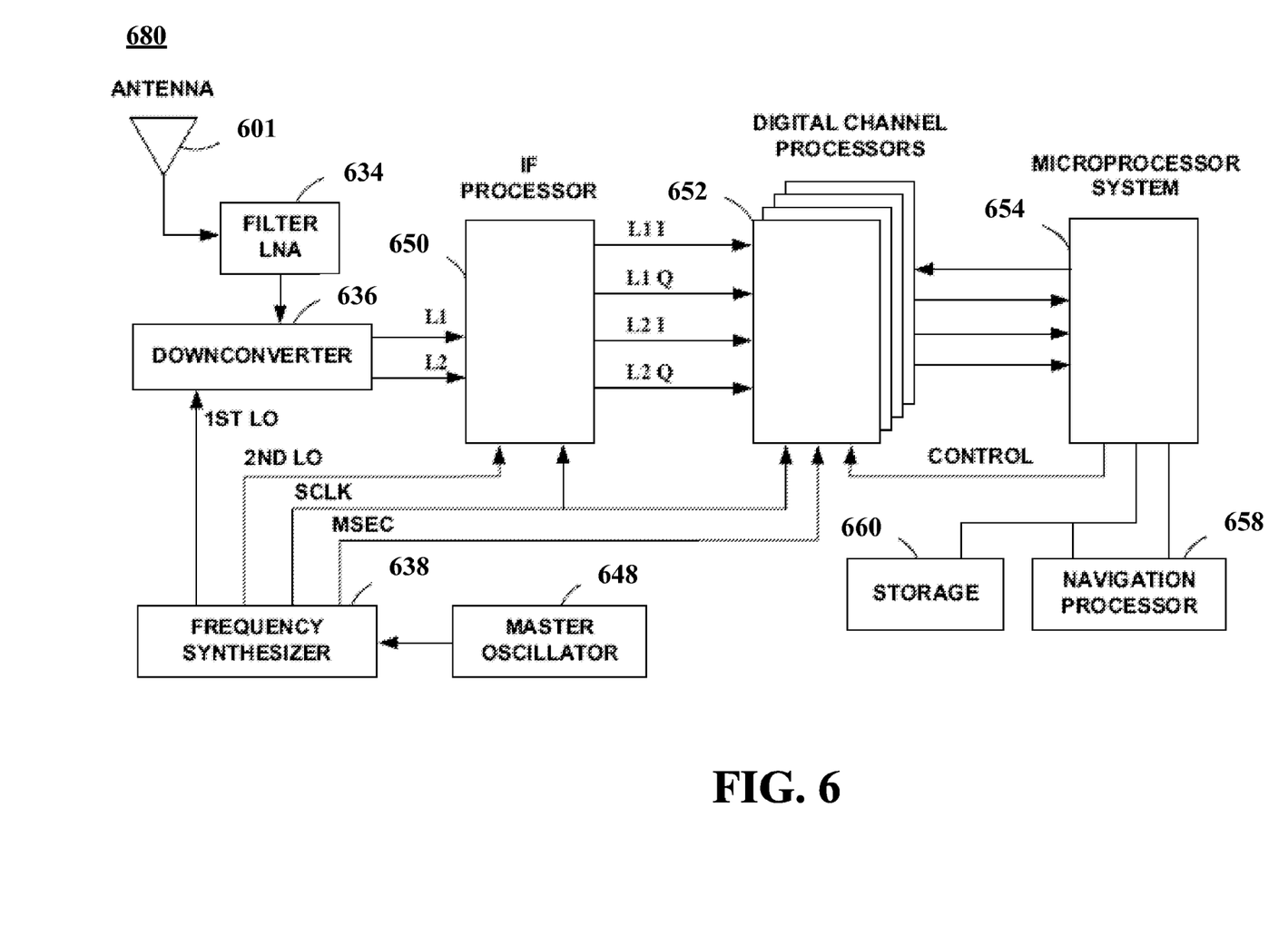
FIG. 6 is a block diagram of an example GNSS receiver which may be used in accordance with one embodiment of the present technology.

With reference now to FIG. 6, a block diagram is shown of an embodiment of an example GNSS receiver which may be used in accordance with various embodiments described herein. In particular, FIG. 6 illustrates a block diagram of a GNSS receiver in the form of a general purpose GPS receiver 680 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s).

Embodiments of the present technology may be utilized by GNSS receivers which access the L1 signals alone, or in combination with the L2 signal(s). A more detailed discussion of the function of a receiver such as GPS receiver 680 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 680 of FIG. 6.

In FIG. 6, received L1 and L2 signal is generated by at least one GPS satellite. Each GPS satellite generates different signal L1 and L2 signals and they are processed by different digital channel processors 652 which operate in the same way as one another. FIG. 6 shows GPS signals (L1=1575.42 MHz, L2=1227.60 MHz) entering GPS receiver 680 through a dual frequency antenna 601. Antenna 601 may be a magnetically mountable model commercially available from Trimble® Navigation of Sunnyvale, Calif., 94085. Master oscillator 648 provides the reference oscillator which drives all other clocks in the system. Frequency synthesizer 638 takes the output of master oscillator 648 and generates important clock and local oscillator frequencies used throughout the system. For example, in one embodiment frequency synthesizer 638 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 634 performs filtering and low noise amplification of both L1 and L2 signals. The noise figure of GPS receiver 680 is dictated by the performance of the filter/LNA combination. The downconverter 636 mixes both L1 and L2 signals in frequency down to approximately 175 MHz and outputs the analogue L1 and L2 signals into an IF (intermediate frequency) processor 30. IF processor 650 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 652 inputs the digitally sampled L1 and L2 inphase and quadrature signals. All digital channel processors 652 are typically identical by design and typically operate on identical input samples. Each digital channel processor 652 is designed to digitally track the L1 and L2 signals produced by one satellite by tracking code and carrier signals and to form code and carrier phase measurements in conjunction with the microprocessor system 654. One digital channel processor 652 is capable of tracking one satellite in both L1 and L2 channels.

Microprocessor system 654 is a general purpose computing device which facilitates tracking and measurements processes, providing pseudorange and carrier phase measurements for a navigation processor 658. In one embodiment, microprocessor system 654 provides signals to control the operation of one or more digital channel processors 652. Navigation processor 658 performs the higher level function of combining measurements in such a way as to produce position, velocity and time information for the differential and surveying functions. Storage 660 is coupled with navigation processor 658 and microprocessor system 654. It is appreciated that storage 660 may comprise a volatile or non-volatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Embodiments of the present invention are thus described. While the present invention has been described in numerous embodiments, the foregoing descriptions of embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application.

What is claimed is:

1. A method for integration of real-time field data in chemical spraying vehicle operations, said method comprising:
    receiving information for a plurality of regions designated for chemical spraying at a command center, each of the plurality of regions having a defined boundary;
    utilizing real-time and forecast environmental conditions in conjunction with prior and real-time field data to rank each of the plurality of regions;
    automatically selecting and dispatching one or more chemical spraying vehicles to one or more of the plurality of regions; and
    automatically calculating and initiating a region specific chemical spraying procedure when the one or more chemical spraying vehicles are within the defined boundary of one of the plurality of regions for chemical spraying, the calculating incorporating real-time environmental conditions into the chemical spraying vehicles procedure.

2. The method of claim 1 wherein said confirming of said chemical payload further comprises:
    automatically authorizing one or more of said chemical spraying vehicles to obtain a load of said chemical.

3. The method of claim 1, further comprising:
    utilizing a wireless connection between said command center and the one or more selected chemical spraying vehicles to confirm a chemical payload of the one or more selected chemical spraying vehicles.

4. The method of claim 1, further comprising:
    utilizing a wireless connection between said command center and the one or more chemical spraying vehicles to automatically dispatch said one or more chemical spraying vehicles to said regions for chemical spraying.

5. The method of claim 1 further comprising:
    utilizing said real-time and said forecast weather conditions to automatically determine if one or more of said regions is within a pre-determined chemical spraying weather requirement envelope.

6. The method of claim 1, wherein said field data is selected from the group of prior and real-time region data consisting of: information from field technicians, information provided by general public, image recognition, text recognition, news media monitoring, social-media data mining, and laboratory data.

7. The method of claim 1 wherein said automatically dispatching said one or more chemical spraying vehicles comprise:
    providing directions to one or more of said plurality of regions; and providing in region route navigation information and automatic chemical spraying start and stop command coordinates.

8. The method of claim 1 wherein said automatically calculating and initiating chemical spraying procedures further comprises:
utilizing said actual and forecast environmental conditions, said prior and real-time field data and characteristics of said chemical spraying vehicle to generate said region specific chemical spraying procedure.

9. The method of claim 1 further comprising:
automatically updating and re-assessing said actual and forecast environmental conditions for each of said regions;
automatically updating and re-assessing said prior and real-time field data for each of said plurality of regions; and
automatically providing a real-time update to said region route navigation information including automatic chemical spraying start and stop commands to said one or more chemical spraying vehicles.

10. A real-time data collection and field agent controlling system comprising:
a geographic information system (GIS) database comprising previously collected and real-time insect problem data for a plurality of insect control organizations;
a real-time field data assessor communicatively coupled with said GIS database, said real-time field data assessor comprising:
a periodic GIS database reviewer; and
a potential insect problem early identifier and location establisher; and
a real-time field agent controller communicatively coupled with the real-time field data accessor, said real-time field agent controller comprising:
a potential insect problem early identifier receiver;
a field agent location database that has field agent location information comprising locations, routes and schedules stored thereon;
a field agent re-tasker comprising:
a task priority generator;
a field agent contact module; and
a field agent schedule modifying module for modifying a field agent's schedule to include the inspection of the location of said potential insect problem and the task priority.

11. The system of claim 10 wherein the real-time field agent controller selects the field agent schedule for modifying based on a field agent's schedule route that passes closest to the potential insect problem location.

12. The system of claim 10 wherein the real-time field agent controller selects the field agent schedule for modifying based on a field agent's present location task priority.

13. The system of claim 10 wherein if the task priority generator tasks the potential insect problem as a high priority, the field agent schedule modifying module will modify a plurality of field agents schedules to include the inspection of the location of said potential insect problem and the task priority.

14. The system of claim 10 wherein the GIS database comprising polygon outlines of the geo-locations and data on the types of insects for which said insect control organization is responsible as well as contact information and rules for forwarding incoming data for each said insect control organization.

15. The system of claim 10 wherein the GIS database includes data from the group consisting of: a specimen collection, a specimen test result, a direct telephone report, a direct media report, a direct medical report and an indirect report.

16. The system of claim 15 wherein said specimen collection is selected from the collection group consisting of: trapping, water testing, larvaciding, and dead animal pickup.

17. The system of claim 15 wherein said direct media report comprises a picture, text message, email or letter stored in the database.

18. The system of claim 15 wherein said direct medical report is selected from the group consisting of: medical facilities, clinics, hospitals, emergency rooms, fire departments and police departments.

19. The system of claim 15 wherein said indirect report is a social-media data mining module that scans and collects data from social networking internet sites suggesting insect problems or insect borne diseases.

20. An automated chemical spraying system comprising:
a plurality of regions needing chemical spraying;
a real-time field data assessor communicatively coupled with a geographic information system (GIS) database, said real-time field data assessor comprising:
a periodic GIS database reviewer; and
a potential insect problem early identifier and location establisher;
a chemical spraying vehicle selector communicatively coupled with said GIS database to select the appropriate chemical spraying vehicle for said plurality of regions needing chemical spraying;
a real-time region prioritizer for prioritizing the plurality of regions needing chemical Spraying,
a route generator comprising a spraying route for a chemical spraying vehicle;
a real-time controller communicatively coupled with said route generator and said chemical spraying vehicle, said real-time controller comprising:
an approximately real-time chemical spraying vehicle monitor for vehicle information consisting of: location information, correct chemical validation, vehicle speed, deviations in route, fuel consumption, mileage information, idle time reports, safe driver score cards, mobile worker optimization score cards, driver time sheets, off-hour usage, unauthorized usage, stop reports, speeding alerts, spraying on events and spraying off events; and
a graphic user interface (GUI) comprising:
an interactive visual representation of the information from the chemical spraying vehicle monitor;
a spray zone plume analyzer based on chemical spraying vehicle sprayer settings and weather conditions; and
an overlay of a map of the region for real-time human monitoring.

21. The system of claim 20 wherein the GIS database comprises:
previously collected and real-time collected insect problem data for a plurality of insect control organizations; and
environmental information from the group consisting of past weather data, present weather data, forecast weather data, chemical spraying vehicle characteristics, previous chemical spraying deployment route(s), previous chemical spraying deployment result(s) and no chemical spraying zone(s).

* * * * *